(12) United States Patent
Yasunaga (10) Patent No.: US 11,124,028 B2
(45) Date of Patent: Sep. 21, 2021

(54) PNEUMATIC TIRE

(71) Applicant: Toyo Tire & Rubber Co., Ltd., Itami (JP)

(72) Inventor: Toshikazu Yasunaga, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 350 days.

(21) Appl. No.: 16/161,334

(22) Filed: Oct. 16, 2018

(65) Prior Publication Data
US 2019/0126691 A1 May 2, 2019

(30) Foreign Application Priority Data
Oct. 31, 2017 (JP) .............................. JP2017-210931

(51) Int. Cl.
*B60C 13/00* (2006.01)
*B60C 13/02* (2006.01)

(52) U.S. Cl.
CPC ............ *B60C 13/02* (2013.01); *B60C 13/001* (2013.01); *B60C 13/002* (2013.01)

(58) Field of Classification Search
CPC ....... B60C 13/002; B60C 13/02; B60C 13/00; B60C 13/001
USPC ...................................................... D12/605
See application file for complete search history.

(56) References Cited

U.S. PATENT DOCUMENTS

| | | | |
|---|---|---|---|
| 2011/0139326 A1 | 6/2011 | Nukushina | |
| 2014/0283968 A1 | 9/2014 | Matsumoto | |
| 2015/0321523 A1* | 11/2015 | Takahashi | B60C 13/002 |
| | | | 152/523 |
| 2017/0267033 A1 | 9/2017 | Iwabuchi | |
| 2018/0141390 A1* | 5/2018 | Miyasaka | B60C 11/00 |

FOREIGN PATENT DOCUMENTS

| | | |
|---|---|---|
| CN | 105082889 A | 11/2015 |
| EP | 3 192 675 A1 | 7/2017 |
| JP | 2011-121523 A | 6/2011 |
| JP | 2014-180947 A | 9/2014 |
| JP | 2015-13605 A | 1/2015 |
| JP | 2016-215694 | * 12/2016 |
| JP | 2016-215697 | * 12/2016 |
| WO | WO2016/182076 | * 11/2016 |

OTHER PUBLICATIONS

English machine translation of JP2016-215694. (Year: 2016).*
(Continued)

*Primary Examiner* — Robert C Dye
(74) *Attorney, Agent, or Firm* — Westerman, Hattori, Daniels & Adrian, LLP (57) ABSTRACT

A pneumatic tire exerts an excellent blurring effect on irregularities resulting from a boundary between members in a sidewall portion. A pneumatic tire includes a serration portion formed by providing multiple basic ridges side by side at intervals in a tire circumferential direction on a surface of a sidewall portion, and multiple sub-ridges extending in a direction crossing the basic ridges and shorter than the basic ridges, which are provided without coupling the basic ridges neighboring each other.

8 Claims, 8 Drawing Sheets

(56) References Cited

OTHER PUBLICATIONS

Office Action dated Jul. 3, 2020, issued in counterpart [CN] Application No. 201811181809.3, with English machine tanslation.(10 pages).
Office Action dated Mar. 15, 2021, issued in counterpart CN application No. 201811181809.3, with English translation. (10 pages).
Office action dated Jun. 8, 2021, issued in counterpart JP Application No. 2017-210931, with English Translation. (9 pages).

* cited by examiner

PNEUMATIC TIRE

CROSS-REFERENCE TO RELATED APPLICATIONS

This application is based upon and claims the benefit of priority from the prior Japanese Patent Application No. 2017-210931, filed on Oct. 31, 2017; the entire contents of which are incorporated herein by reference.

BACKGROUND

1. Technical Filed

Embodiments of the present invention relates to a pneumatic tire.

2. Related Art

Irregularities often appear locally on a surface of a sidewall portion of a pneumatic tire due to, for example, a seam joint to a carcass ply which is an internal structural member of the tire. Such irregularities resulting from a boundary between members are made less noticeable by providing a serration portion formed by providing ridges, which are narrow protruding threads, side by side on the surface of the sidewall portion as are described in JP-A-2011-121523, JP-A-2014-180947, and JP-A-2015-013605.

A typical serration portion in the related art is formed by providing multiple ridges extending along a tire radial direction or extending at an inclination with respect to the tire radial direction at regular intervals in a tire circumferential direction.

SUMMARY

The typical serration portion in the related art, however, cannot be said to have exerted a satisfactory blurring effect on irregularities resulting from a boundary between members.

An embodiment of the present invention has an object to provide a pneumatic tire exerting an excellent blurring effect on irregularities resulting from a boundary between members in a sidewall portion.

A pneumatic tire according to an embodiment of the present invention includes a serration portion formed by providing multiple basic ridges side by side at intervals in a tire circumferential direction on a surface of a sidewall portion, and multiple sub-ridges extending in, a direction crossing the basic ridges and shorter than the basic ridges, which are provided without coupling the basic ridges neighboring each other.

According to the above embodiment, in addition to the basic ridges forming the serration portion, the sub-ridges extending in a direction crossing the basic ridges are provided. Hence, a blurring effect on irregularities resulting from a boundary between members can be enhanced and stiffness of the sidewall portion can be also increased. Further, the sub-ridges are provided without coupling the basic ridges neighboring each other in the tire circumferential direction. Hence, deterioration in mud draining performance and water draining performance on the surface of the sidewall portion can be reduced. Also, deterioration in heat dissipation performance can be reduced by lessening heat remaining on the surface of the sidewall portion.

DETAILED DESCRIPTION

Hereinafter, embodiments will be described with reference to the drawings.

First Embodiment

Figure 1:
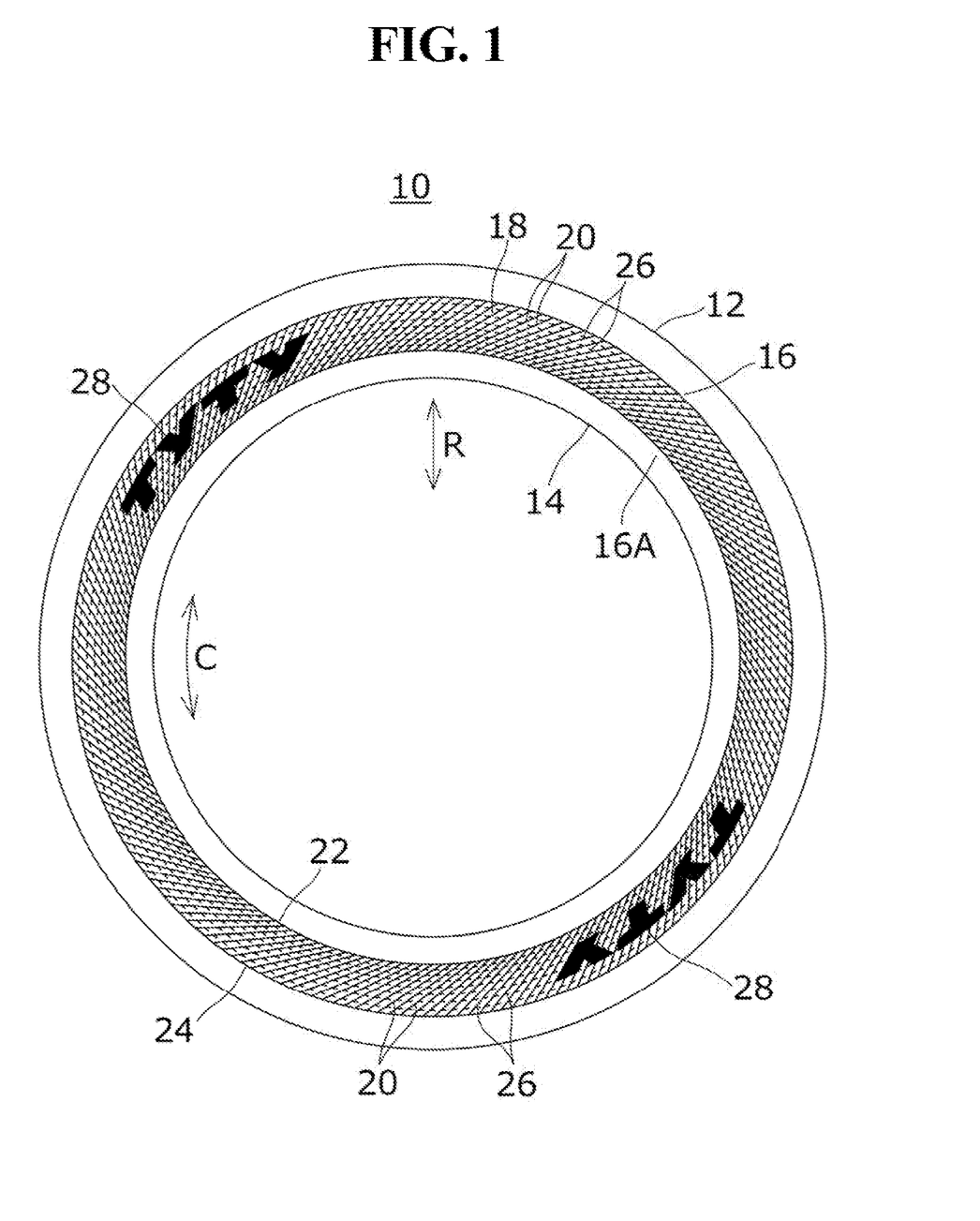
FIG. 1 is a side view of a pneumatic tire according to a first embodiment.

FIG. 1 is a view showing a side surface of a pneumatic tire 10 according to one embodiment. The pneumatic tire 10 includes a tread portion 12 forming a ground-contact surface, a pair of left and right bead portions 14, and a pair of left and right sidewall portions 16 interposed between the tread portion 12 and the bead portions 14. A serration portion 18 is provided to a surface (that is, outer surface) of at least one sidewall portion 16. The sidewall portions 16 are made of sidewall rubber 16A and the serration portion 18 is provided to a surface of the sidewall rubber 16A by vulcanization molding.

In an example described herein, the serration portion 18 is formed in an annular shape extending along a fill circumference in a tire circumferential direction C at a center of the sidewall portion 16 including a tire maximal width position. However, the serration portion 18 may be provided in a part in the tire circumferential direction C. For example, although illustrations are omitted herein, the serration portion 18 may be formed in a strip shape cut at both ends in the tire circumferential direction C or may include multiple strip-shaped serration portions spaced apart in the tire circumferential direction C.

The serration portion 18 is a striped pattern portion formed by providing multiple basic ridges 20, which are protruding threads rising from a surface of the sidewall portion 16, side by side at intervals in the tire circumferential direction C. In the example described herein, the basic ridges 20 are ridges extending linearly at an inclination of a constant angle with respect to a tire radial direction R. By providing a plurality of the inclined basic ridges 20 at regular intervals in the tire circumferential direction C, a basic pattern of the serration portion 18 is formed. The tire radial direction R is same as a meridional direction (direction along a tire meridian) in the sidewall portion 16.

Although an illustration is omitted herein, the basic ridges 20 may extend along the tire radial direction R, in which case a radial pattern is formed by the basic ridges 20 as a pattern of the serration portion 18. In the present embodiment, the basic ridges 20 extend from an inner side to an outer side in the tire radial direction R and may extend either linearly as described above or in a curved shape by, for example, curving from the inner side to the outer side in the tire radial direction R.

In the example described herein, the serration portion 18 includes an inner circumferential ridge 22 and an outer circumferential ridge 24 on an inner circumferential edge and an outer circumferential edge, respectively. As is shown in FIG. 1, the inner circumferential ridge 22 and the outer circumferential ridge 24 are circular protruding threads extending along a full circumference in the tire circumferential direction C and formed concentrically. Multiple basic ridges 20 are coupled to the inner circumferential ridge 22 at one end extend from the one end to the outer circumferential ridge 24 while being inclined with respect to the tire circumferential direction C toward the outer side in the tire radial direction R (that is, toward the tread portion 12), and terminate at the other end which is coupled to the outer circumferential ridge 24.

Figure 2:
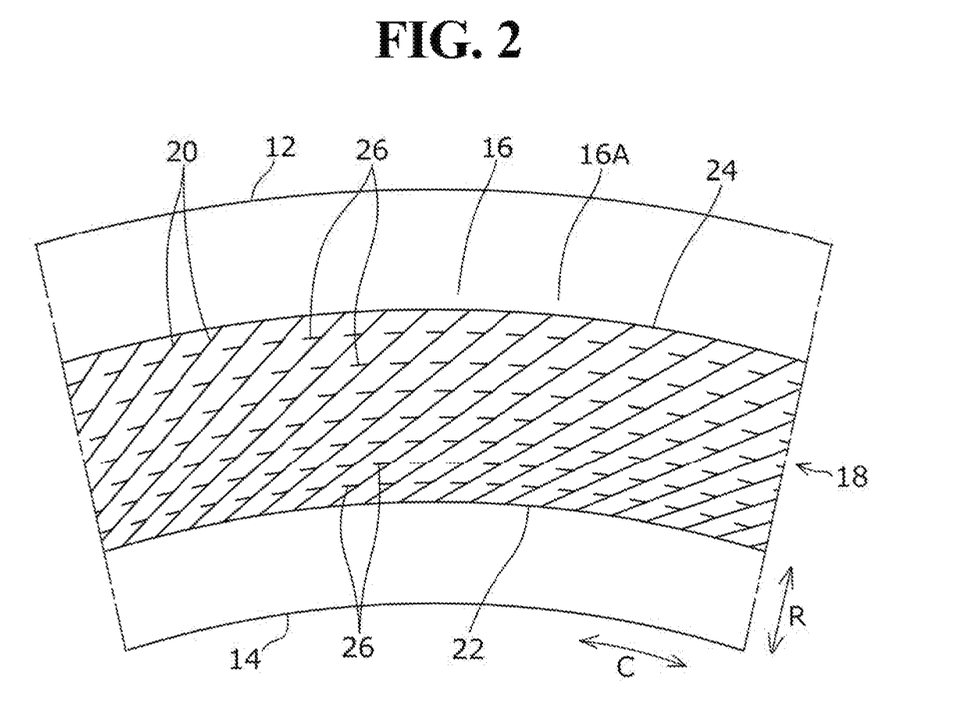
FIG. 2 is an enlarged side view of a major portion of the pneumatic tire shown in FIG. 1.

As is enlarged in FIG. 2, the serration portion 18 is provided with multiple sub-ridges 26 extending in a direction crossing the basic ridges 20. As with the basic ridges 20, the sub-ridges 26 are protruding threads rising from the surface of the sidewall portion 16 and short and small ridges shorter than the basic ridges 20.

The sub-ridges 26 are provided without coupling the basic ridges 20 and 20 neighboring each other in the tire circumferential direction C. That is, the basic ridges 20 and 20 neighboring each other are not coupled by the sub-ridges 26, and in the example described herein, the respective basic ridges 20 are provided independently of each other in a portion between the inner circumferential ridge 22 and the outer circumferential ridge 24 excluding the both circumference ridges 22 and 24.

As is shown in FIG. 2, multiple (a group of) sub-ridges 26 are provided and connected to each of the multiple basic ridges 20. That is, each basic ridge 20 is provided with the multiple (seven in FIG. 2) sub-ridges 26 coupled to the basic ridge 20. In the example described herein, the respective sub-ridges 26 in a group branch from the basic ridge 20 in a same direction.

Each sub-ridge 26 is coupled to the basic ridge 20 at one end, extends along the tire circumferential direction C from the one end, and terminates before it reaches a neighboring basic ridge 20 so as not to be coupled to the neighboring basic ridge 20. The sub-ridges 26 are formed to branch from, that is, to protrude from the coupled-basic ridges 20 in a same direction along the full circumference in the tire circumferential direction C.

Figure 3:
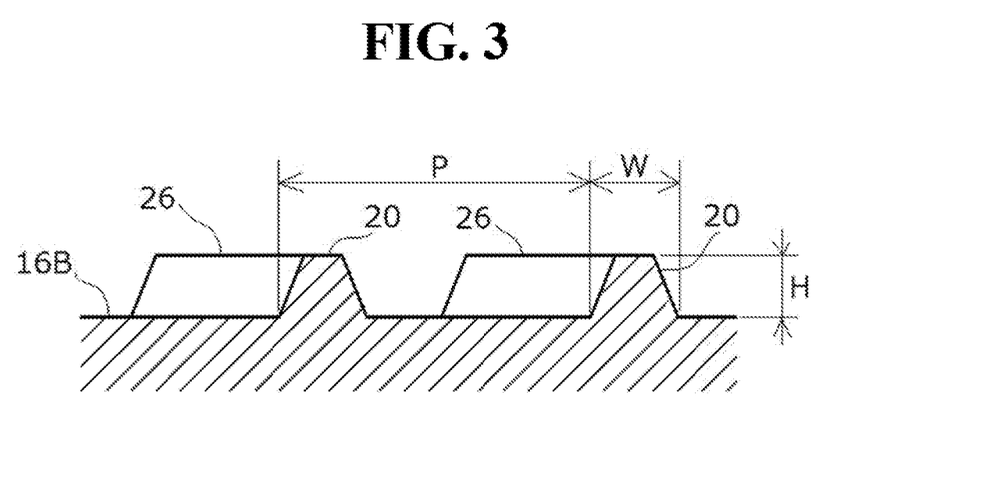
FIG. 3 is a sectional view showing a sectional shape of ridges.

A sectional shape of the basic ridges 20 and the sub-ridges 26 is not particularly limited. For example, the sectional shape may be, for example, a trapezoidal shape as is shown in FIG. 3. Alternatively, although illustrations are omitted herein, the sectional shape may be a triangular shape, a rectangular shape, or a semi-circular shape. Sectional shapes of the basic ridges 20 and the sub-ridges 26 may be either same or different. A height H of the basic ridges 20 and the sub-ridges 26 (a protruding height from a surface 16B of the sidewall portion 16) is not particularly limited, either. For example, the height H may be 0.2 to 2.0 mm and may be 0.5 to 1.5 mm. Heights H of the basic ridges 20 and the sub-ridges 26 may be either same or different. A width W of the basic ridges 20 and the sub-ridges 26 is not particularly limited, either. For example, the width W may be 0.1 to 2.0 mm and may be 0.2 to 1.0 mm. Widths W of the basic ridges 20 and the sub-ridges 26 may be either same or different. A pitch P between the basic ridges 20 provided in the tire circumferential direction C is not particularly limited, either. For example, the pitch P may be 1.2 to 5.0 mm and may be 1.5 to 3.5 mm.

As is shown in FIG. 1, in the example described herein, a mark 28, "TYTY", is provided in the serration portion 18. The mark 28 is formed of letters (including numbers), symbols, figures, and so on, and an example of which is display information of various types, such as a manufacturer, a brand, a type, and a size of a tire. A manner in which to provide the mark 28 is not particularly limited, and the mark 28 may be provided to rise, sink, or outline edges of a raised portion by making the inside hollow in the serration portion 18.

According to the first embodiment, by providing the serration portion 18 with the basic ridges 20 plus the sub-ridges 26 extending in a direction crossing the basic ridges 20, a blurring effect on irregularities resulting from a boundary between members can be enhanced.

By providing the sub-ridges 26 extending in a direction crossing the basic ridges 20 in addition to the basic ridges 20, stiffness of the sidewall portion 16 can be increased. By providing and connecting the multiple sub-ridges 26 to each basic ridge 20, the basic ridge 20 is reinforced by the multiple sub-ridges 26, which can in turn enhance a stiffness increasing effect on the sidewall portion 16.

The basic ridges 20 and 20 neighboring each other in the tire circumferential direction C are not coupled by the sub-ridges 26. Hence, not only a flow channel for mud and water but also a heat releasing path can be secured between the basic ridges 20 and 20 neighboring each other. Hence, deterioration in mud draining performance and water draining performance on the surface of the sidewall portion 16 can be reduced. In addition, deterioration in heat dissipation performance can be reduced by lessening heat remaining on the surface of the sidewall portion 16.

The sub-ridges 26 are ridges extending in the tire circumferential direction C. Hence, front-rear stiffness (stiffness in the tire circumferential direction C) is increased while limiting deterioration in ride quality by reducing an increase in longitudinal stiffness (stiffness in the tire radial direction R). Consequently, driving stability, braking performance, and traction can be enhanced.

Second Embodiment

Figure 4:
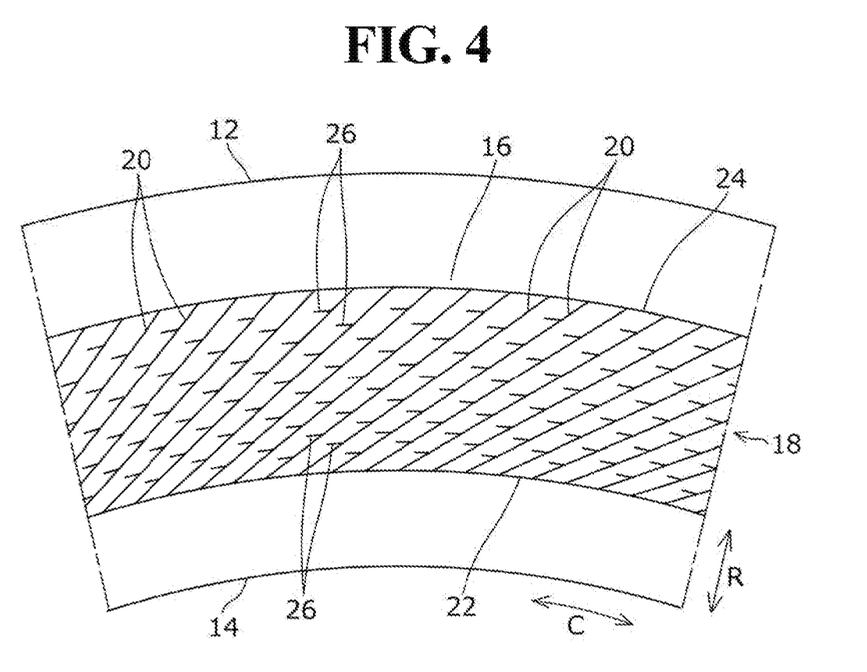
FIG. 4 is an enlarged side view of a major portion of a pneumatic tire according to a second embodiment.

As is shown in FIG. 4, a serration portion 18 of a pneumatic tire according to a second embodiment is different from the first embodiment above in that sub-ridges 26 are disposed at different positions in a tire radial direction R between basic ridges 20 and 20 neighboring each other.

That is, the multiple sub-ridges 26 for each basic ridge 20 are disposed at same positions in the tire radial direction R between the basic ridges 20 and 20 neighboring each other in the first embodiment above. By contrast, the multiple sub-ridges 26 are disposed at different positions between the basic ridges 20 and 20 neighboring each other in the second embodiment. More specifically, as is shown in FIG. 4, the sub-ridges 26 are provided alternately in the tire radial direction R between the basic ridges 20 and 20 neighboring each other. Hence, the sub-ridges 26 are provided at every other basic ridge 20 in the tire circumferential direction C at each position in the tire radial direction R.

As has been described, the sub-ridges 26 are not necessarily disposed at same positions between the basic ridges 20 and 20 neighboring each other and may be provided at different positions. The remaining configuration, a function, and an advantage of the second embodiment are same as the configuration, the function, and the advantage of the first embodiment above, and a description is omitted herein.

Third Embodiment

Figure 5:
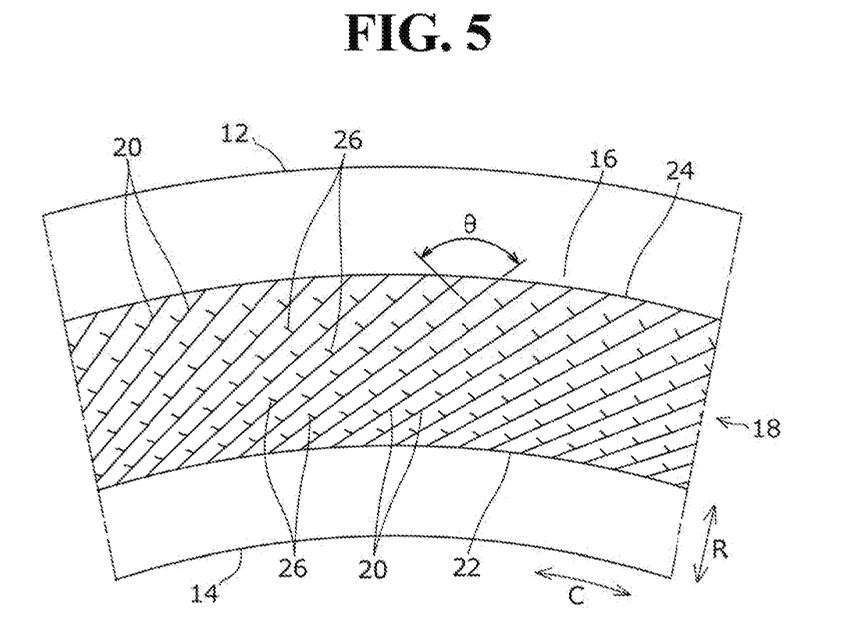
FIG. 5 is an enlarged side view of a major portion of a pneumatic tire according to a third embodiment.

As is shown in FIG. 5, a serration portion 18 of a pneumatic tire according to a third embodiment is different from the first embodiment above in that sub-ridges 26 are provided substantially perpendicularly to bask ridges 20.

That is, the sub-ridges 26 do not extend along a tire circumferential direction C in the third embodiment. Instead, the sub-ridges 26 are provided to cross the basic ridges 20, which are inclined as described above, at a substantially perpendicular angle θ. The term, "substantially perpendicular", referred to herein means an angle visually perceived substantially as being perpendicular, and for example, 90 degrees±10 degrees (that is, 80° to 100°).

In the third embodiment, the sub-ridges 26 are provided substantially perpendicularly to the basic ridges 20. Hence, longitudinal stiffness can be increased in comparison with the first embodiment above. The remaining configuration, a function, and an advantage of the third embodiment are same as the configuration, the function, and the advantage of the first embodiment above, and a description is omitted herein.

Fourth Embodiment

Figure 6:
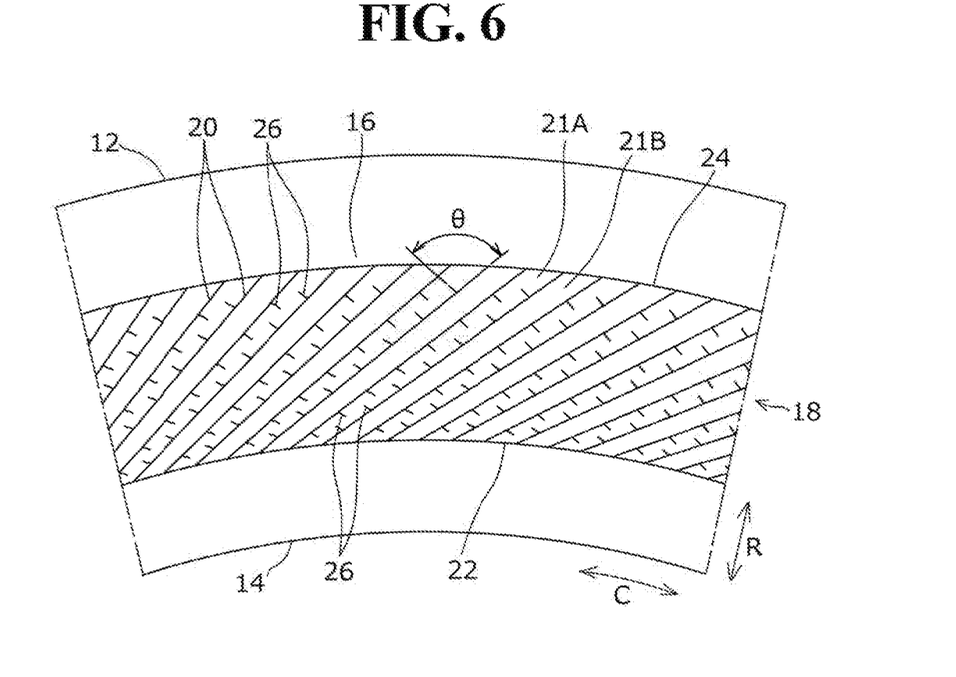
FIG. 6 is an enlarged side view of a major portion of a pneumatic tire according to a fourth embodiment.

As is shown in FIG. 6, a serration portion 18 of a pneumatic tire according to a fourth embodiment is different from the third embodiment above in that branching directions of sub-ridges 26 from basic ridges 20 are changed.

Given that the two basic ridges 20 and 20 neighboring each other form one set in the third embodiment above. Then, a branching direction of the sub-ridges 26 from one basic ridge 20 is inverted in the serration portion 18 of the fourth embodiment. Hence, as is shown in FIG. 6, the serration portion 18 has a configuration where a pair of the basic ridges 20 and 20 from which the sub-ridges 26 branch in directions to face each other are provided side by side in the tire circumferential direction C. Consequently, a spacing between the basic ridges 20 and 20 neighboring each other includes a spacing 21A where the sub-ridges 26 are present because the sub-ridges 26 branch from both sides and a spacing 21B where the sub-ridges 26 are absent, and the spacing 21A and the spacing 21B are provided alternately in the tire circumferential direction C.

As has been described, branching directions of the sub-ridges 26 from the basic ridges 20 are not necessarily the same and the sub-ridges 26 branching in a different direction may be included, in which case a variation can be given to an outward appearance. The remaining configuration, a function, and an advantage of the fourth embodiment are same as the configuration, the function, and the advantage of the third embodiment above, and a description is omitted herein.

Fifth Embodiment

Figure 7:
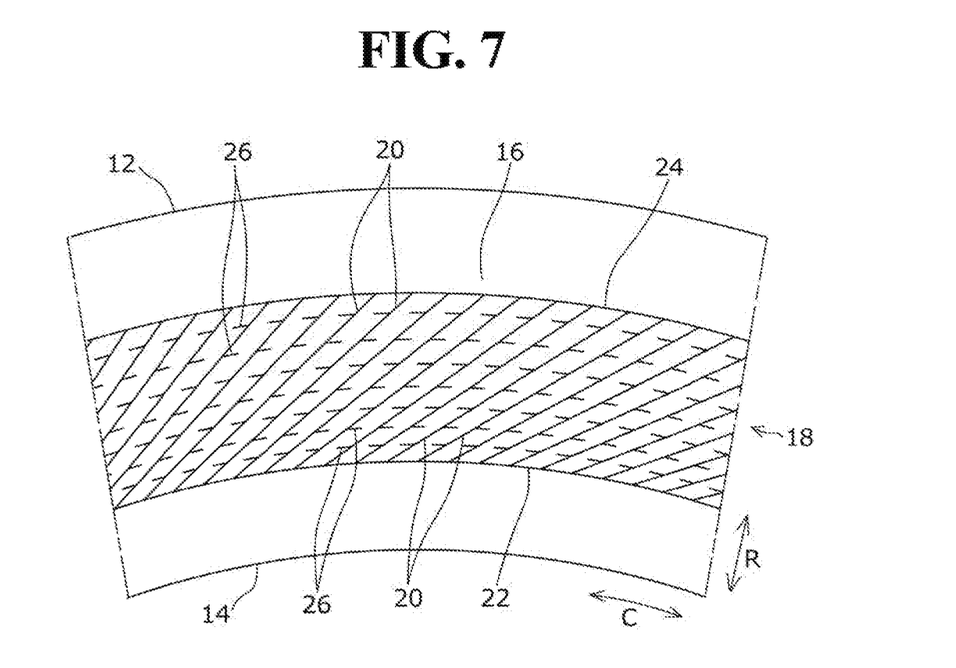
FIG. 7 is an enlarged side view of a major portion of a pneumatic tire according to a fifth embodiment.

As is shown in FIG. 7, a serration portion 18 of a pneumatic tire according to a fifth embodiment is different from the first embodiment above in that a branching direction of the sub-ridges 26 from the basic ridges 20 is changed in each basic ridge 20.

That is, in the serration portion 18 of the fifth embodiment, a branching direction of the multiple sub-ridges 26 in each basic ridge 20 is set alternately rightward and leftward in a tire radial direction R. Hence, the sub-ridges 26 branch alternately from both sides of each basic ridge 20. More specifically, the sub-ridges 26 are set to branch alternately to one side and to the other side of each basic ridge 20 in a tire circumferential direction C from an inner side to an outer side in the tire radial direction R.

As has been described, a branching direction of the sub-ridges 26 from one basic ridge 20 may be set to both sides of the basic ridge 20, in which case a blurring effect of irregularities resulting from a boundary between members can be enhanced. The remaining configuration, a function, and an advantage of the fifth embodiment are same as the configuration, the function, and the advantage of the first embodiment above, and a description is omitted herein.

Sixth Embodiment

Figure 8:
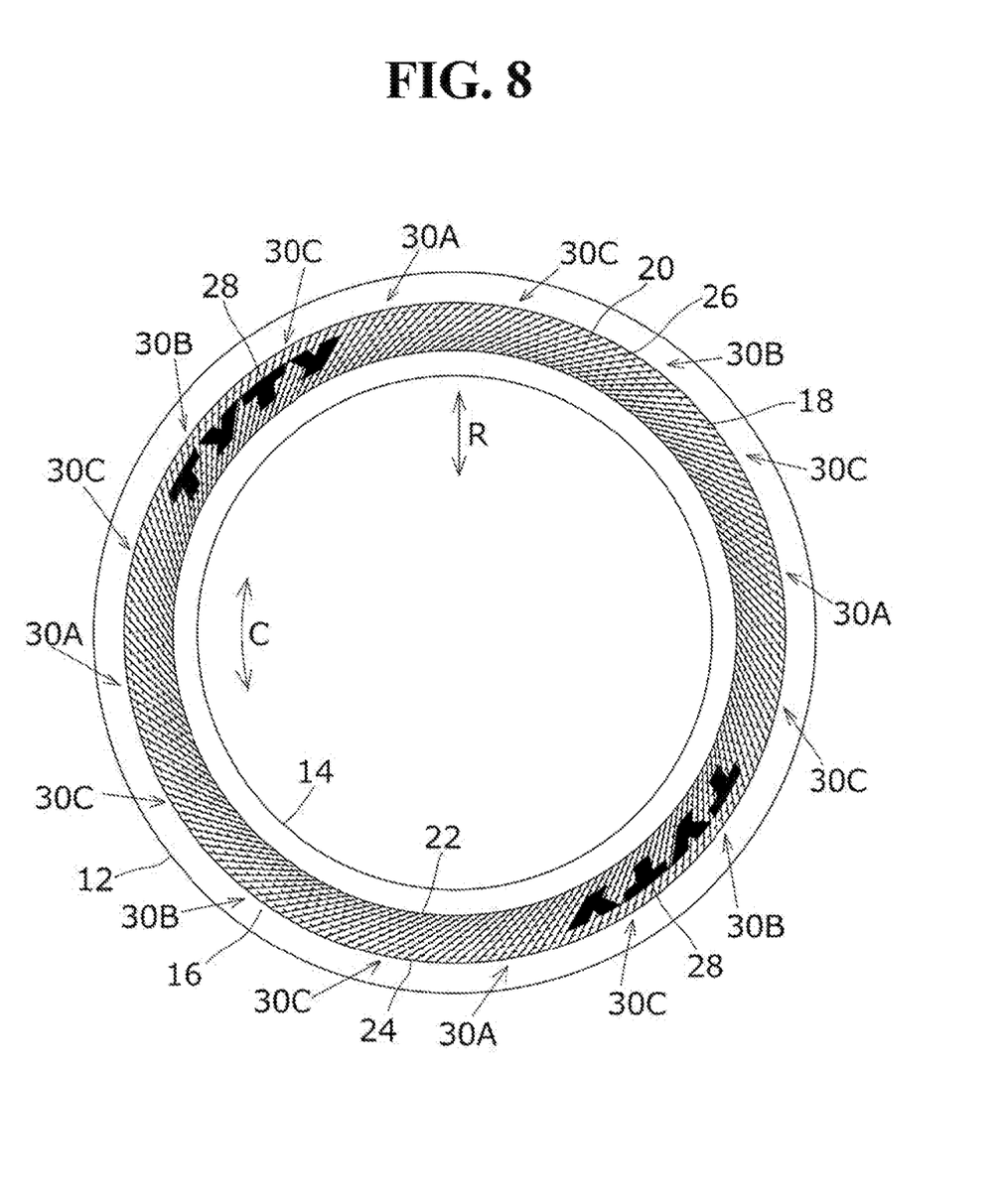
FIG. 8 is a side view of a pneumatic tire according to a sixth embodiment.
Figure 9:
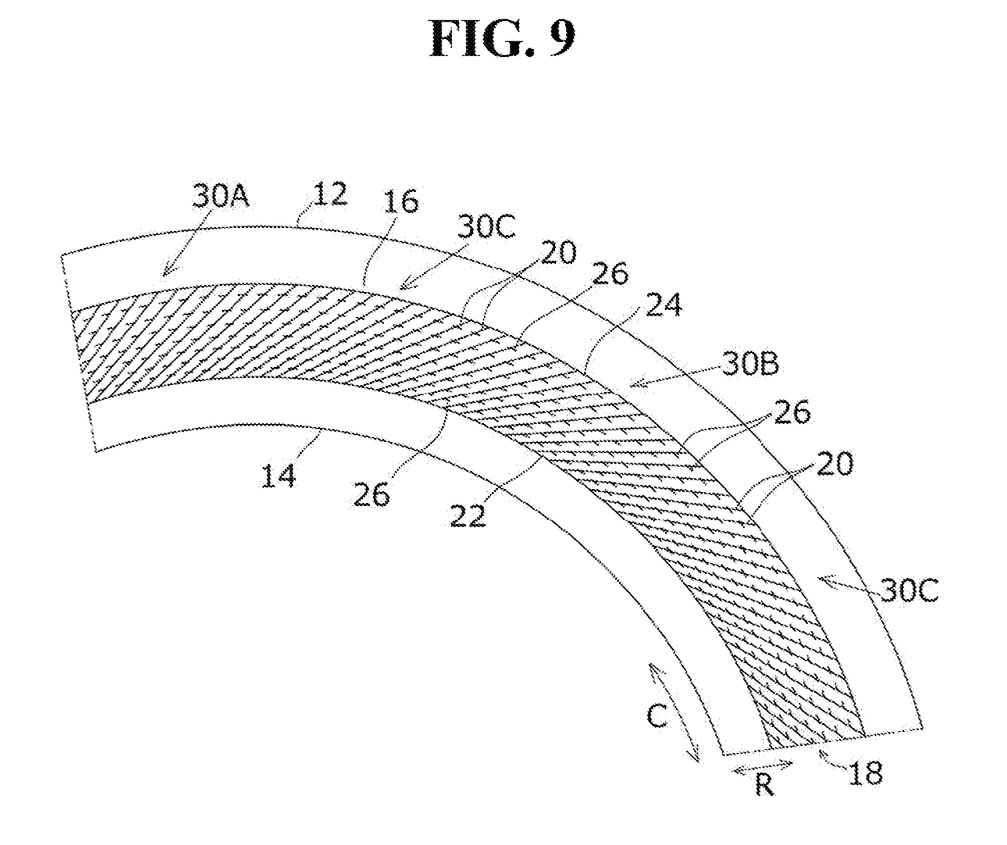
FIG. 9 is an enlarged side view of a major portion of the pneumatic tire shown in FIG. 8.

As are shown in FIGS. 8 and 9, a serration portion 18 of a pneumatic tire according to a sixth embodiment is different from the first embodiment above in that crossing positions of sub-ridges 26 with basic ridges 20 change in a tire circumferential direction C. That is, in the sixth embodiment, crossing positions of the sub-ridges 26 with the basic ridges 20 are not constant among the multiple basic ridges 20 provided side by side in the tire circumferential direction C and the crossing positions are changed in the tire circumferential direction C.

In the first embodiment above, the sub-ridges 26 cross the basic ridges 20 at one end and crossing positions with the basic ridges 20 are constant. By contrast, crossing positions of the sub-ridges 26 with the basic ridges 20 gradually change from one end to the other end in the tire circumferential direction C in the sixth embodiment. More specifically, in an example described herein, the respective sub-ridges 26 cross the basic ridges 20 at one end in multiple (four in FIG. 8) portions 30A in the tire circumferential direction C, and the respective sub-ridges 26 cross the basic ridges 20 at the other end in multiple portions 30B which are intermediate points between the portions 30A while crossing positions of respective sub-ridge 26 with the basic ridges 20 gradually change between the portions 30A and 30B. Hence, the respective sub-ridges 26 cross the basic ridges 20 at a center in a length direction in portions 30C which are intermediate points between the portions 30A and 30B.

By changing the crossing positions of the sub-ridges 26 from one end to the other end in the manner as above, the sub-ridges 26 branching from the basic ridges 20 in different directions are included. That is, protruding directions of the sub-ridges 26 from the basic ridges 20 are different between the portions 30A and 30B.

By changing the crossing positions of the sub-ridges 26 in the manner as above, a variation can be given to an outward appearance. In such a case, the crossing positions may be changed little by little as are shown in FIGS. 8 and 9. However, the crossing positions may be changed abruptly in, for example, one or more than one portion on a circumference. The remaining configuration, a function, and an advantage of the sixth embodiment are same as the configuration, the function, and the advantage of the first embodiment above, and a description is omitted herein.

Seventh Embodiment

Figure 10:
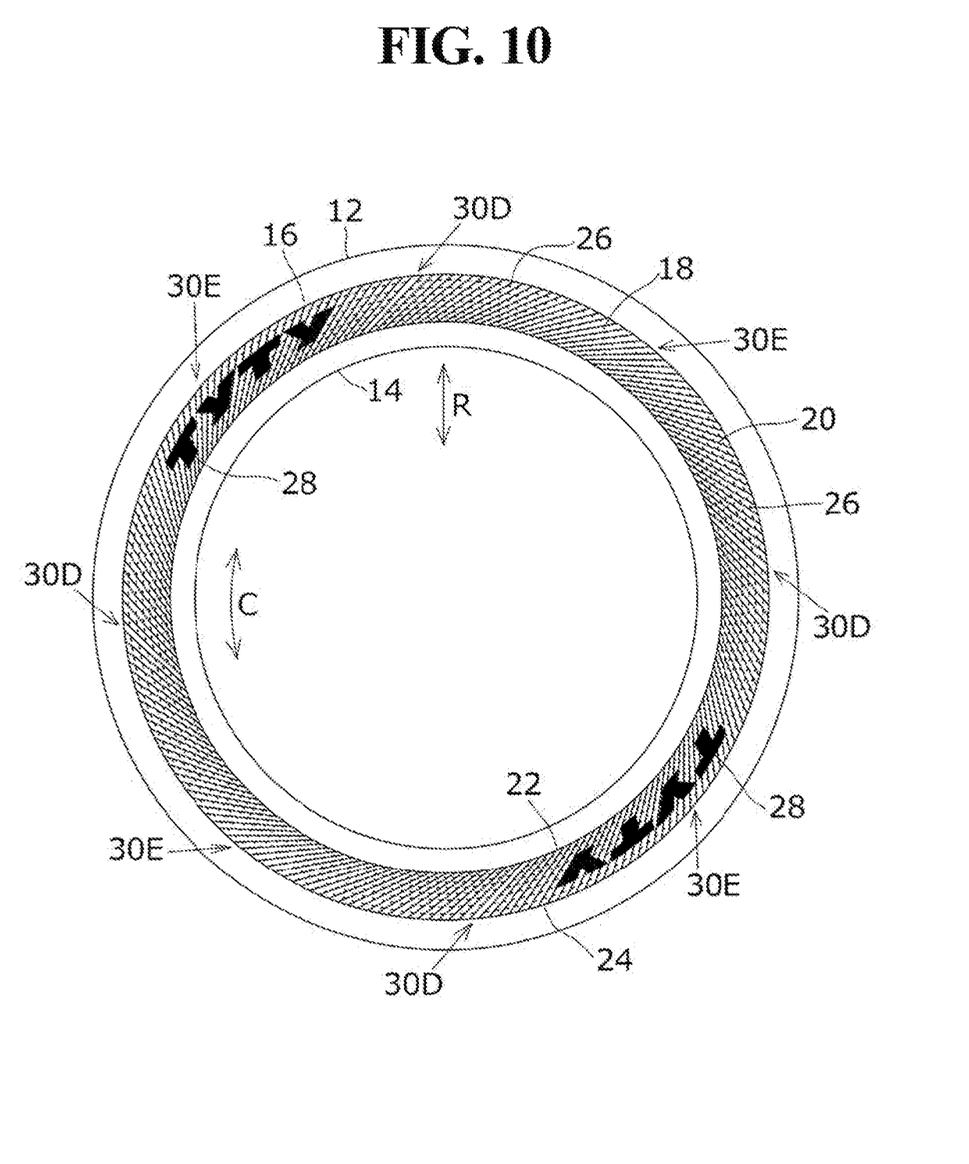
FIG. 10 is a side view of a pneumatic tire according to a seventh embodiment.
Figure 11:
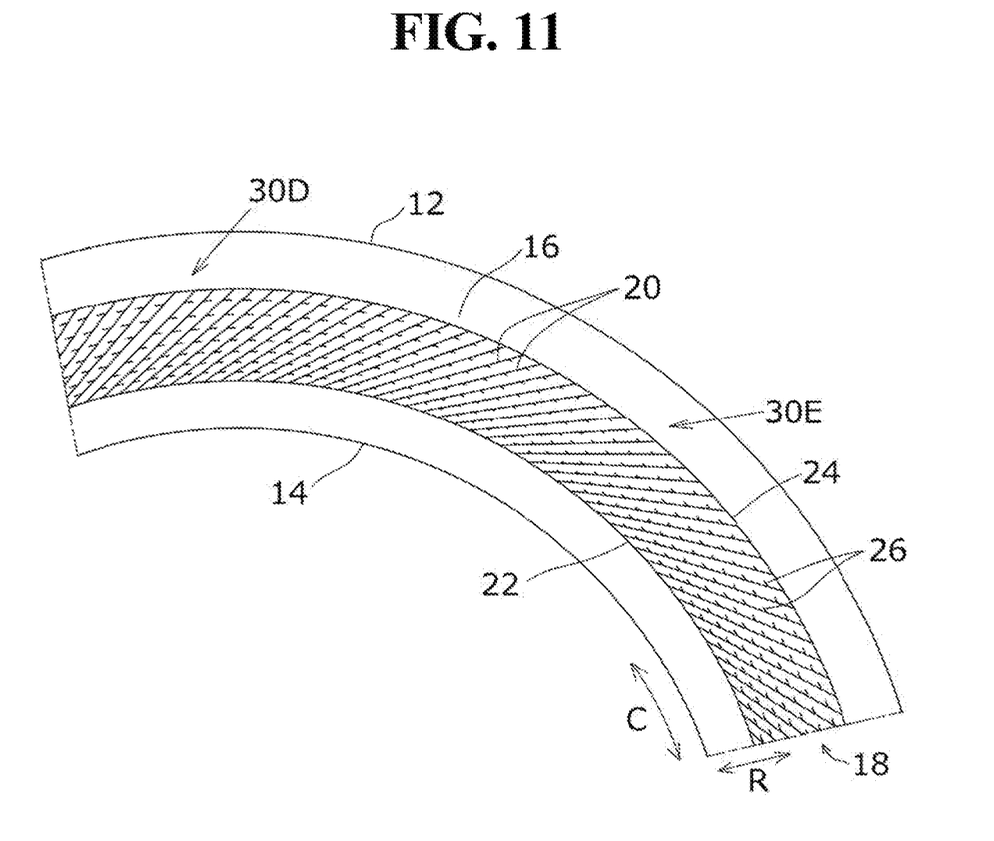
FIG. 11 is an enlarged side view of a major portion of the pneumatic tire shown in FIG. 10.

As are shown in FIGS. 10 and 11, a serration portion 18 of a pneumatic tire according to a seventh embodiment is different from the first embodiment above in that a length of sub-ridges 26 changes in a tire circumferential direction C.

More specifically, in the seventh embodiment, a length of the respective sub-ridges 26 is maximum in multiple (four in FIG. 10) portions 30D in the tire circumferential direction C and a length of the respective sub-ridges 26 is minimum in multiple portions 30E which are intermediate points between the portions 30D. While a length of the respective sub-ridges 26 changes gradually between the portions 30D and 30E.

In an example described herein, branching directions of the respective sub-ridges 26 from basic ridges 20 are inverted between the portions 30D where the length is maximum and the portions 30E where the length is minimum.

By changing the length of the sub-ridges 26 in the manner as above, a variation can be given to an outward appearance. In such a case, the length may be changed little by little as are shown in FIGS. 10 and 11. However, the length may be changed abruptly in, for example, one or more than one portion on a circumference. The remaining configuration, a function, and an advantage of the seventh embodiment are same as the configuration, the function, and the advantage of the first embodiment above, and a description is omitted herein.

Other Embodiments

The respective configurations of the embodiments above may be combined. For example, by combining the sixth embodiment and the seventh embodiment above, a length of the sub-ridges 26 may be changed while changing crossing positions of the sub-ridges 26. Alternatively, by combining the first embodiment and the third embodiment above, a combination of ridges extending in the tire circumferential direction C and ridges crossing the basic ridges 20 substantially perpendicularly may be provided as the sub-ridges 26.

While the above has described several embodiments, these embodiments are presented by mere examples and do not intend to limit the scope of the invention. These novel embodiments can be implemented in various other modifications, and various omissions, replacements, and alterations can be made within the scope of the invention.

The respective dimensions specified herein are dimensions in a normal state in which a pneumatic tire is attached to a regular rim and filled at a normal internal pressure under no load. The term, "a regular rim", referred to herein means "a standard rim" according to the JATMA standards, "a design rim" according to the TRA standards, or "a measuring rim" according to the ETRTO standards. The term, "a regular internal pressure", referred to herein means "a highest air pressure" according to the JATMA standards, "a maximum value" described in "tire load limits at various cold inflation pressures" according to the TRA standards, or "an inflation pressure" according to the ETRTO standards.

What is claimed is:

1. A pneumatic tire, comprising:
a serration portion formed by providing multiple basic ridges side by side at intervals in a tire circumferential direction on a surface of a sidewall portion, the basic ridges extending linearly at an inclination of a constant angle with respect to a tire radial direction; and
multiple sub-ridges extending in a direction crossing the basic ridges and shorter than the basic ridges, which are provided without coupling the basic ridges neighboring each other, each of the sub-ridges being coupled to one of the basic ridges at one end, extending along the tire circumferential direction from the one end, and terminating before it reaches another of the basic ridges which neighbors the one of the basic ridges, wherein:
a group of the sub-ridges are provided and connected to each of the multiple basic ridges, and
a length of the sub-ridges changes in the tire circumferential direction.

2. The pneumatic tire according to claim 1, wherein:
crossing positions of the sub-ridges with the basic ridges change in the tire circumferential direction.

3. The pneumatic tire according to claim 1, wherein:
the sub-ridges include sub-ridges branching from the basic ridges in a different direction.

4. The pneumatic tire according to claim 3, wherein:
the serration portion has a configuration where a pair of the basic ridges from which the sub-ridges branch in directions to face each other are provided side by side in the tire circumferential direction.

5. The pneumatic tire according to claim 1, wherein:
positions of the sub-ridges in the tire radial direction are different between the basic ridges neighboring each other.

6. The pneumatic tire according to claim 1, wherein:
a spacing between two of the basic ridges neighboring each other includes a first spacing in which the sub-ridges are present and branch from both sides, and a second spacing in which the sub-ridges are absent, and the first spacing and the second spacing are provided alternately in the tire circumferential direction.

7. The pneumatic tire according to claim 1, wherein
the sub-ridges are configured to branch alternately to one side and to the other side of each of the basic ridges in the tire circumferential direction from an inner side to an outer side in the tire radial direction.

8. A pneumatic tire, comprising:
a serration portion formed by providing multiple basic ridges side by side at intervals in a tire circumferential direction on a surface of a sidewall portion, the basic ridges extending linearly at an inclination of a constant angle with respect to a tire radial direction; and
multiple sub-ridges extending in a direction crossing the basic ridges and shorter than the basic ridges, which are provided without coupling the basic ridges neighboring each other, each of the sub-ridges being coupled to one of the basic ridges at one end, extending along the tire circumferential direction from the one end, and terminating before it reaches another of the basic ridges which neighbors the one of the basic ridges, wherein:
crossing positions of the sub-ridges with respect to the basic ridges gradually change from one end to the other end of the respective sub-ridge in the tire circumferential direction.

* * * * *